(12) United States Patent
Kosugi et al.

(10) Patent No.: US 11,971,501 B2
(45) Date of Patent: Apr. 30, 2024

(54) SENSOR MODULE

(71) Applicant: Lenovo (Singapore) Pte. Ltd., Singapore (SG)

(72) Inventors: Kazuhiro Kosugi, Kanagawa (JP); Yafeng Shao, Beijing (CN); Wenjin Niu, Kanagawa (JP); Yun Zhu, Beijing (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 364 days.

(21) Appl. No.: 17/374,120

(22) Filed: Jul. 13, 2021

(65) Prior Publication Data
US 2022/0026554 A1 Jan. 27, 2022

(30) Foreign Application Priority Data
Jul. 22, 2020 (CN) .......................... 202010712007.1

(51) Int. Cl.
*G01S 7/02* (2006.01)
(52) U.S. Cl.
CPC ................... *G01S 7/027* (2021.05)
(58) Field of Classification Search
CPC ............. G01S 7/027; G01S 13/08
See application file for complete search history.

(56) References Cited

U.S. PATENT DOCUMENTS

2023/0025442 A1* 1/2023 Baur .................. G01S 7/03

FOREIGN PATENT DOCUMENTS

| EP | 3379286 A1 * | 9/2018 | ......... B60K 31/0008 |
| JP | 2003255922 A | 9/2003 | |
| WO | WO-2019110518 A1 * | 6/2019 | |

* cited by examiner

*Primary Examiner* — Daniel D Chang
(74) *Attorney, Agent, or Firm* — Osha Bergman Watanabe & Burton LLP

(57) ABSTRACT

A sensor module includes a sensor module main body having a rectangular board provided with a radio radar sensor function, and a metallic case having a rectangular parallelepiped box shape in which an opening part opened at one face in a thickness direction is formed and a cut-out opening for drawing out a cable connecting the sensor module main body is formed on a side face, the opening part being closed by the board inserted through the opening part with a component disposed on a front face of the board facing toward a bottom part on the inner side, and the cable is inserted into at least a part of the cut-out opening, and the cut-out opening is formed to be symmetrical with respect to a plane passing through the center of the metallic case and perpendicular to a plane of the cut-out opening.

7 Claims, 7 Drawing Sheets

SENSOR MODULE

CROSS-REFERENCE TO RELATED APPLICATIONS

This application claims priority to Chinese Patent Application No. 202010712007.1 filed Jul. 22, 2020, the contents of which are hereby incorporated herein by reference in their entirety.

BACKGROUND

Technical Field

The present invention relates to a sensor module capable of, when a radio radar sensor is used as a proximity sensor, preventing radio waves from sneaking around to the rear and improving stability of mounting on an information processing apparatus and robustness of the radio radar sensor.

Related Art

Some information processing apparatuses such as a PC (Personal Computer) include a proximity sensor (PS) that detects approach of a user. As the proximity sensor, an infrared (IR) sensor is used. A user can start the information processing apparatus only by approaching without contacting it. In addition, some information processing apparatuses include an authenticating processing unit that performs facial image recognition for an image taken by a camera in identity confirmation. It is designed to reduce operations related to a start-up.

For example, Japanese Unexamined Patent Application Publication No. 2003-255922 describes a terminal processing apparatus that displays an operation screen for terminal processing, detects a human in front of a display unit, and displays the operation screen in response to the detection of the human. This terminal apparatus performs predetermined terminal processing based on a received input operation in a state of displaying the operation screen.

However, the facial image recognition using an imaging camera as a proximity sensor that detects proximity of a human who is willing to use the information processing apparatus imposes a great processing load on an information processing apparatus main body.

In addition, when an optical sensor such as an infrared sensor is used, its detection area is small. Then, it is considered to use a radio radar sensor with a small processing load and a large detection area as the proximity sensor.

This radio radar sensor must irradiate only a front side of, for example, the information processing apparatus, in particular, the display unit, with radio waves, and thus it is necessary to shield the rear and sides of a radio radar sensor board in order to prevent radio waves from sneaking around to the rear and sides of the display unit. This shielding of the radio radar sensor can be made with metallic foil etc. However, when the shielding is made with the metallic foil etc., mounting of the radio radar sensor board on the information processing apparatus becomes unstable and robustness against an external stress is reduced.

SUMMARY

One or more embodiments provide a sensor module capable of, when a radio radar sensor is used as a proximity sensor, preventing radio waves from sneaking around to the rear and improving stability of mounting on an information processing apparatus and robustness of the radio radar sensor.

A sensor module according to one or more embodiments includes a sensor module main body having a rectangular board provided with a radio radar sensor function, and a metallic case having a rectangular parallelepiped box shape in which an opening part opened at one face in a thickness direction is formed and a cut-out opening for drawing out a cable connecting the sensor module main body is formed on a side face, the opening part being closed by the board inserted through the opening part with a component disposed on a front face of the board facing toward a bottom part on the inner side, and the cable is inserted into at least a part of the cut-out opening, and the cut-out opening is formed to be symmetrical with respect to a plane passing through the center of the metallic case and perpendicular to a plane of the cut-out opening.

In addition, an insulation region is formed over an entire circumference of a peripheral edge portion of the board.

In addition, the sensor module according to the second aspect includes a sensor module main body having a rectangular board provided with a radio radar sensor function, and a metallic case having a rectangular parallelepiped box shape in which an opening part opened at one face in a thickness direction is formed and a cut-out opening for drawing out a cable connecting the sensor module main body is formed in a side face, the opening part being closed by the board inserted through the opening part with a component disposed on a front face of the board facing inward, and an insulation region is formed over an entire circumference of a peripheral edge portion of the board.

In the sensor module according to the above-described aspect, the cut-out opening may be formed to be cut out at one side face in a short direction from the opening part side, not to include both end parts of the metallic case in a long direction, and to include the center in the long direction.

In addition, a plurality of the cut-out openings may be formed to be cut out at one side face in a short direction from the opening part side and not to include both end parts and the center of the metallic case in a long direction.

In addition, the sensor module main body may be provided with spacers abutting against the bottom part of the metallic case and electrically conducting the board and the metallic case, on a front face at both end parts in a long direction, an amount of elastic deformation of the spacer in a short direction may be larger than an amount of elastic deformation in the long direction, and the sensor module main body has a resistor component for adjusting a radio frequency disposed inside of the spacer in the long direction.

According to the above-described aspects, it is possible to, when a radio radar sensor is used as a proximity sensor, prevent radio waves from sneaking around to the rear and improve stability of mounting on an information processing apparatus and robustness of the radio radar sensor.

DETAILED DESCRIPTION

Hereinafter, embodiments of the present invention will be described in detail with reference to the attached drawings.

<Mounting Position of Sensor Module>

Figure 1:
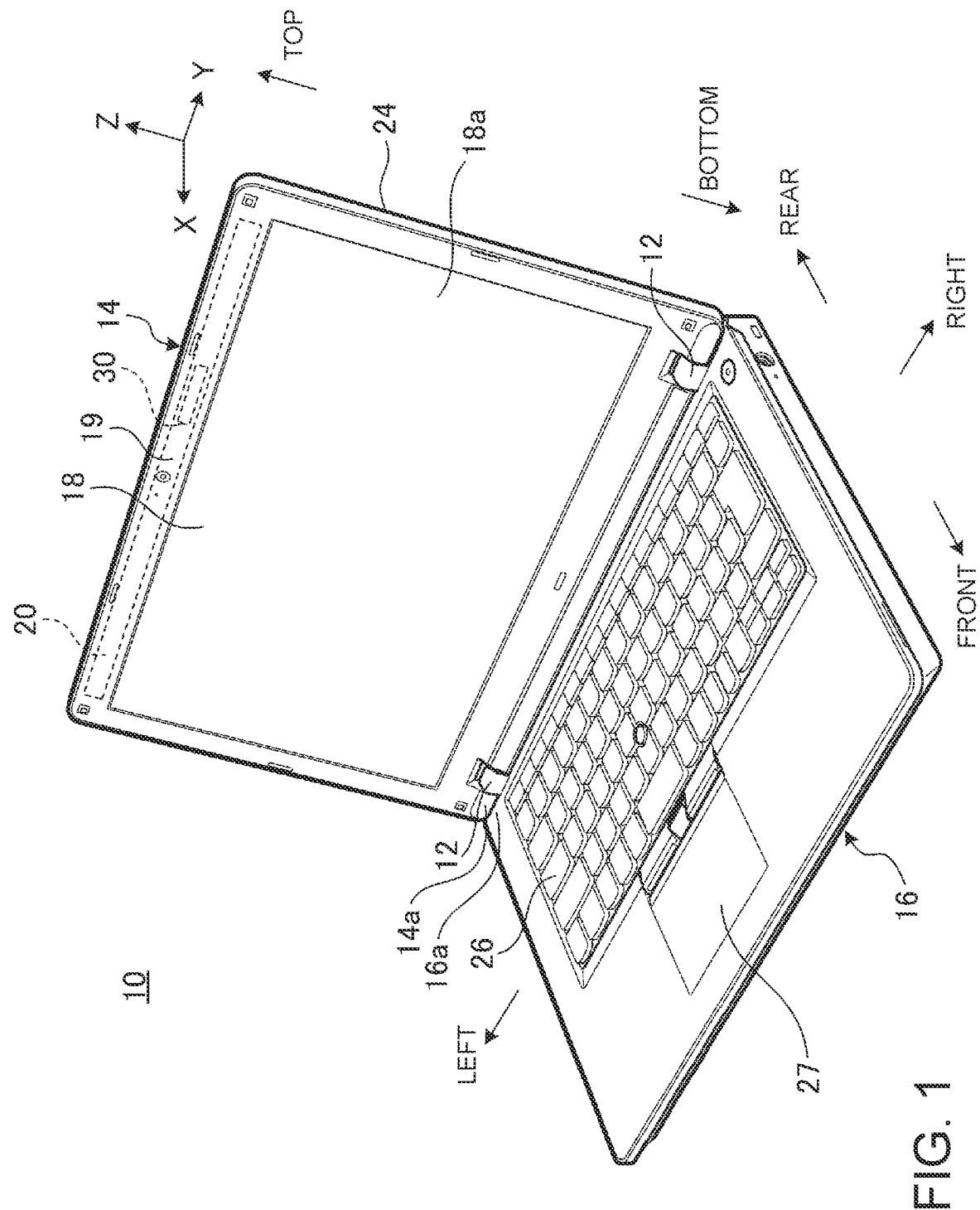
FIG. 1 is a perspective view of an information processing apparatus that is mounted with a sensor module according to one or more embodiments.

FIG. 1 is a perspective view of an information processing apparatus 10 that is mounted with a sensor module 30 according to one or more embodiments. It is to be noted that FIG. 1 illustrates a state in which the information processing apparatus 10 is in a use form of a laptop PC by opening a display chassis 14 away from a main body chassis 16 by a hinge device 12.

The information processing apparatus 10 is a so-called convertible PC that is configured so that the display chassis 14 can be opened and closed with respect to the main body chassis 16 between a closed 0 degree position and a reversed 360 degree position. Therefore, the information processing apparatus 10 can be suitably used as a laptop PC in a state in which the display chassis 14 is rotated to an angular position of about 90 degrees with respect to the main body chassis 16 (refer to FIG. 1). One or more embodiments can also be applied to other than such a convertible PC, for example, to a desktop PC in which the display chassis 14 and the main body chassis 16 are separated.

Hereinafter, as illustrated in FIG. 1, based on the use form of the laptop PC in which the display chassis 14 is opened away from the main body chassis 16 to about 90 degrees, a side of the display chassis 14 near the hinge device 12 is referred to as a bottom side (bottom end) and the other side is referred to as a top side (top end) for description. In addition, a side of the main body chassis 16 near the hinge device 12 is referred to as a rear side (rear end) and the other side is referred to as a front side (front end), and width directions (short directions) of the display chassis 14 and main body chassis 16 are referred to as a left side and a right side, respectively for description. In addition, in the display chassis 14, a +Z direction in a right-handed system is the top side and a +Y direction is the right side, and a display surface 18a is parallel to the Y-Z plane.

As illustrated in FIG. 1, in the information processing apparatus 10, a bottom end part 14a of the display chassis 14 and a rear end part 16a of the main body chassis 16 are rotatably connected by a pair of right and left hinge devices 12.

An inner face of the display chassis 14 is provided with a display device 18. The display chassis 14 is formed into a flat-plate-shaped box body that is thinner than the main body chassis 16 by stacking and coupling a bezel member 19 and a cover member 24.

The display device 18 is constituted by, for example, a touch screen liquid crystal display device. The display device 18 excluding the display surface 18a is covered with metal or a conductive film.

The bezel member 19 is a frame-shaped member made of resin. The bezel member 19 surrounds and holds a peripheral edge portion of the display device 18. The cover member 24 is configured by providing a wall part standing toward the bezel member 19 at a peripheral edge portion of a plate-shaped member made of resin. The cover member 24 covers side faces and a back face of the display chassis 14. The display chassis 14 is connected to the main body chassis 16 through the hinge device 12 that is screwed and fixed to the cover member 24. The display chassis 14 is electrically connected to the main body chassis 16 with a cable (not shown) passing through the hinge device 12.

The main body chassis 16 is a box body formed into a flat-plate shape and has an inner face that is provided with a keyboard device 26 and a touch-pad 27. The main body chassis 16 stores various electronic components including a board, an arithmetic device, and a memory etc. (not shown) therein. The keyboard device 26 may be, for example, a software keyboard etc. in which a virtual keyboard is displayed on a touch screen liquid crystal display device.

A module unit 20 to which various modules including the sensor module 30 are cable-connected is disposed at the top end of the display chassis 14. The various modules include, for example, an antenna of the information processing apparatus 10 for various wireless communications such as a wireless LAN or a wireless WAN. The sensor module 30 is a proximity sensor that detects a human coming close to the front side of the information processing apparatus 10 and is a radio radar sensor. The sensor module 30 transmits/receives radio waves to/from only the front side of the information processing apparatus 10. The sensor module 30 arranges antennas in an array and electrically synthesizes the directivity of the radio waves to scan. That is, the sensor module 30 is a sensor that uses a UWB (Ultra Wide Band) radar.

<Module Unit>

Figure 2:
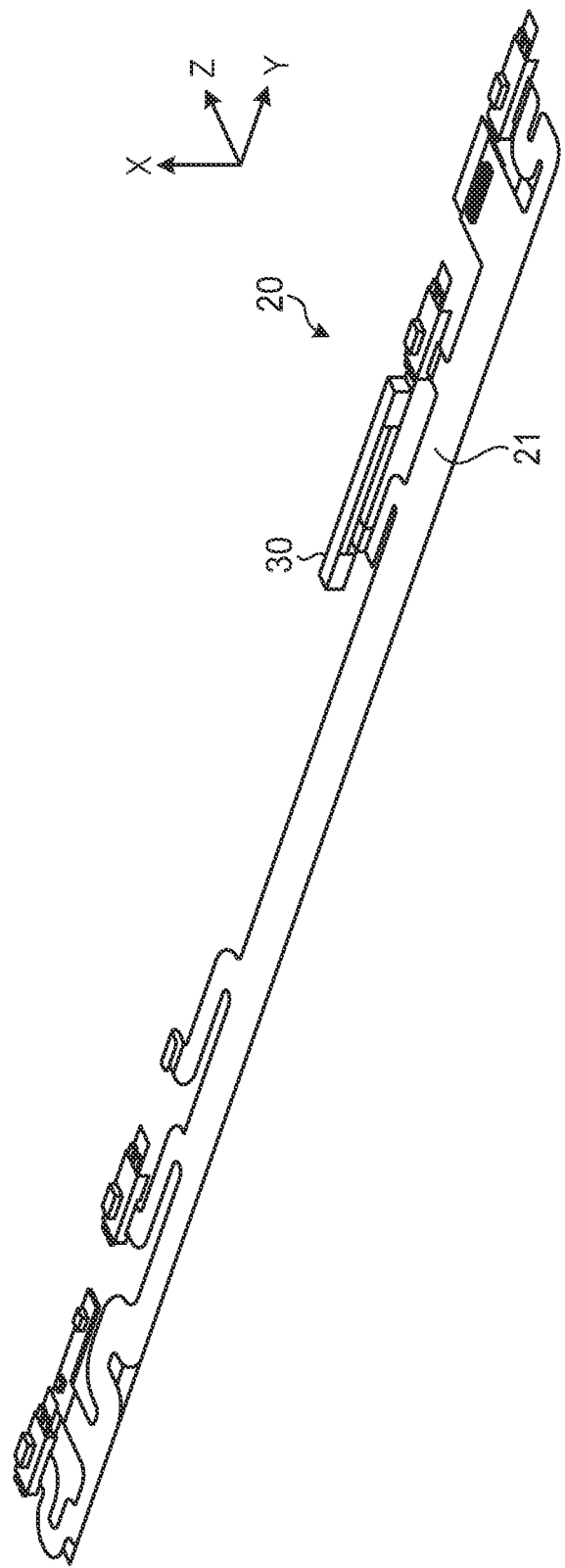
FIG. 2 is a perspective view illustrating a configuration of a module unit.

FIG. 2 is a perspective view illustrating a configuration of the module unit 20. The sensor module 30 and a plurality of various modules are connected to the module unit 20 via a cable 21 such as an FPC cable.

<Sensor Module>

Figure 3:
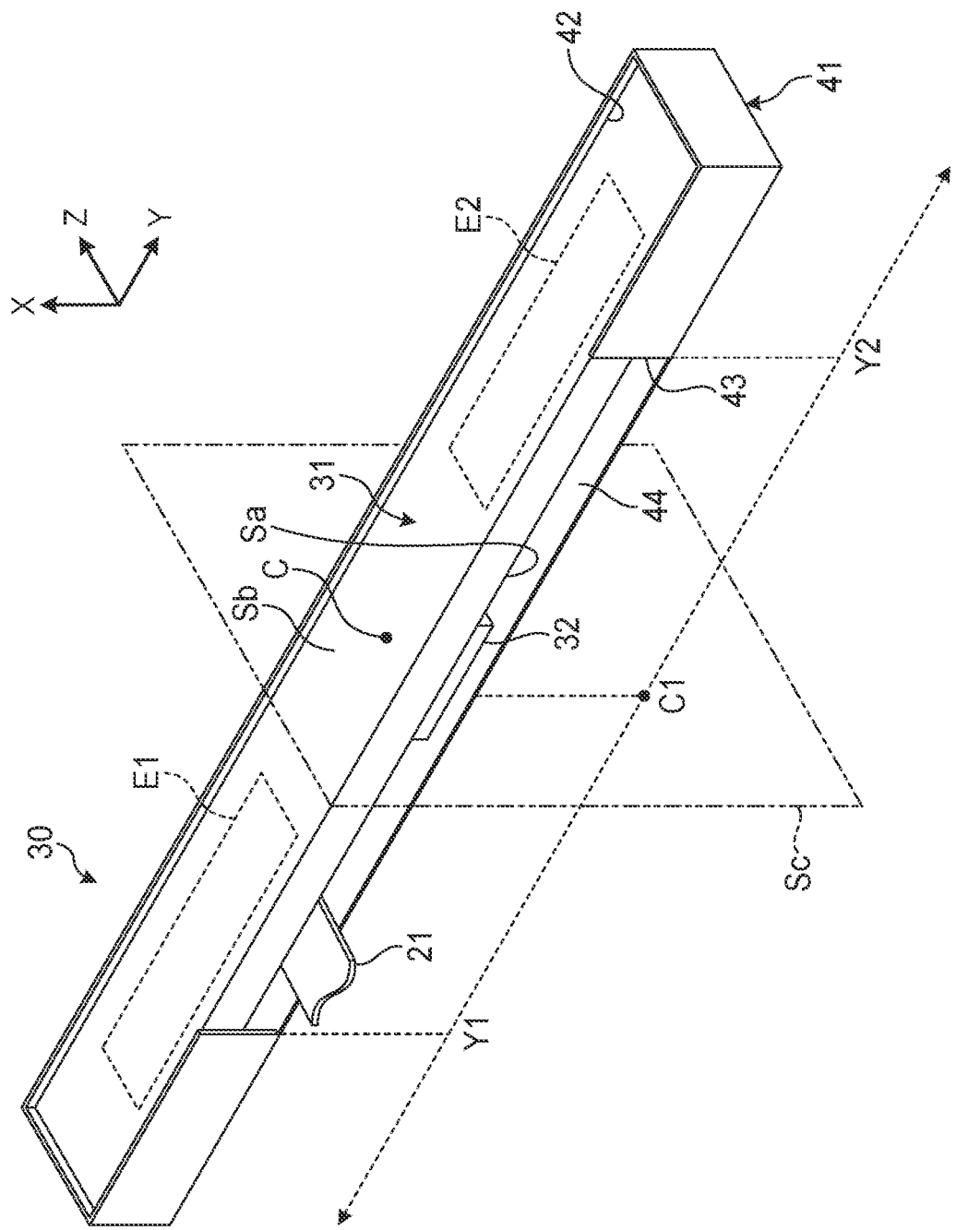
FIG. 3 is a perspective view illustrating a configuration of the sensor module.
Figure 4:
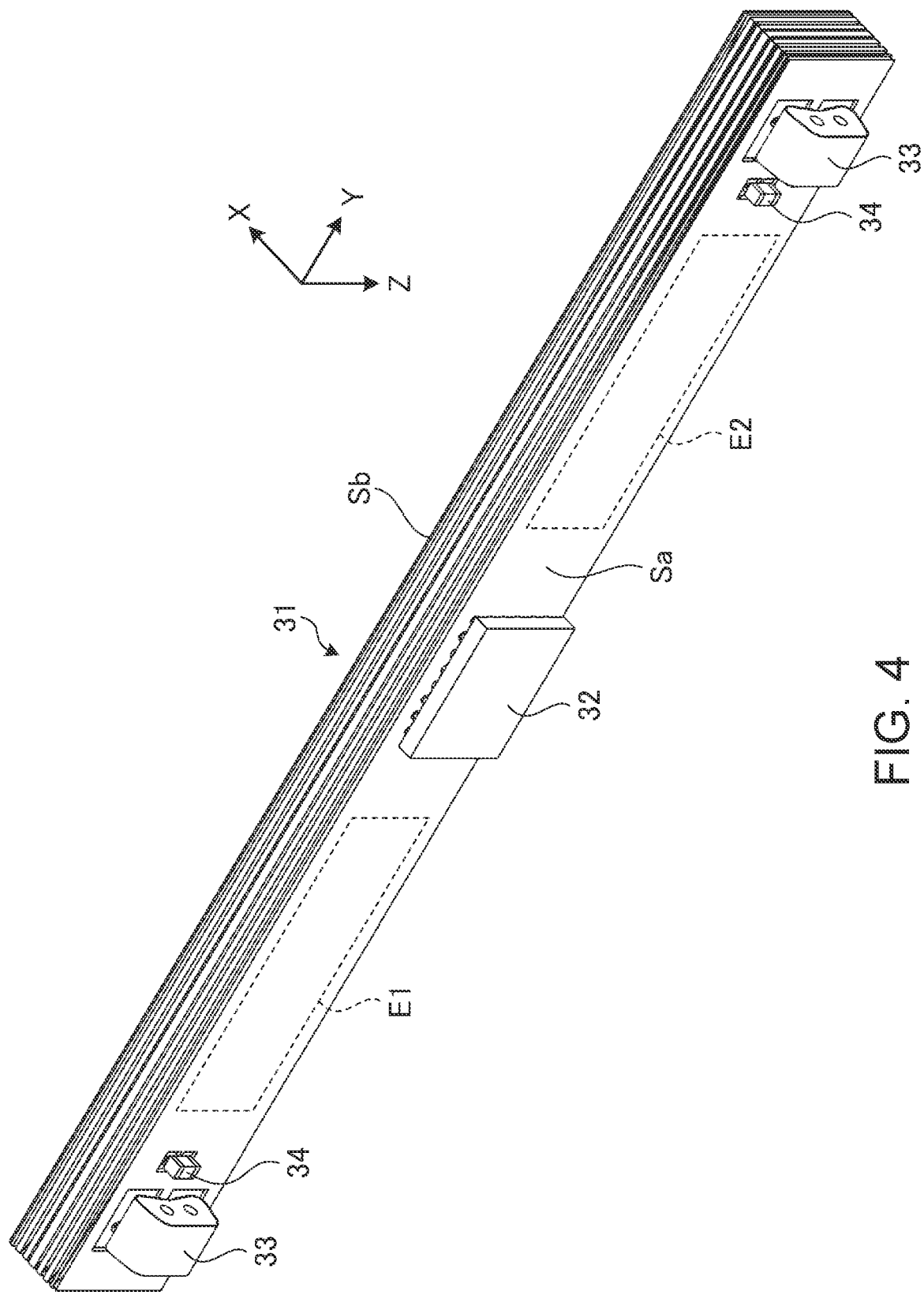
FIG. 4 is a perspective view illustrating a configuration of a sensor module main body that constitutes the sensor module.

FIG. 3 is a perspective view illustrating a configuration of the sensor module 30. In addition, FIG. 4 is a perspective view illustrating a configuration of a sensor module main body 31 that constitutes the sensor module 30. Further, FIG. 5 is a plan view of the sensor module 30 when viewed from the +X direction.

Figure 5:
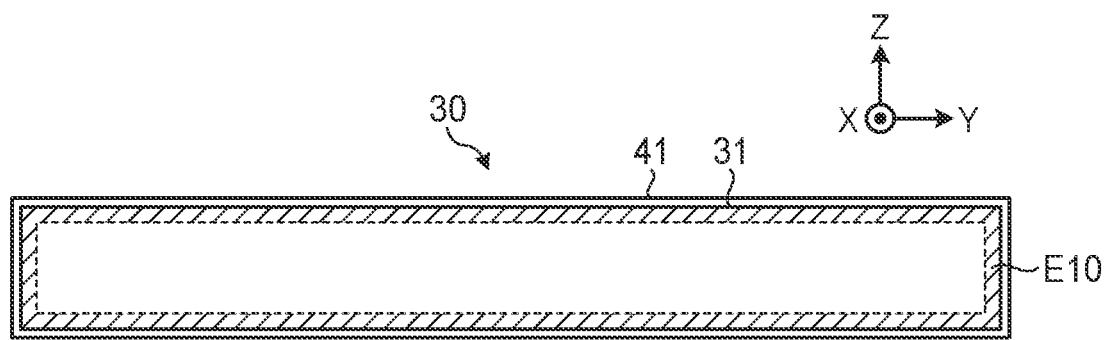
FIG. 5 is a plan view of the sensor module when viewed from the +X direction.

As illustrated in FIG. 3 to FIG. 5, the sensor module 30 has the sensor module main body 31 and a metallic case 41. The sensor module main body 31 has a rectangular long board provided with a radio radar sensor function. The sensor module main body 31 is a printed board that is long in a long direction (Y direction), is short in a short direction (Z direction), and is multi-layered in a thickness direction (X direction). Various components are disposed on a front face Sa of the sensor module main body 31 in the −X direction, and for example, a control chip 32 is disposed in the center in the long direction. It is to be noted that an array antenna is formed in regions E1 and E2 in the multi-layered printed board. A direction in which radio waves are scanned and irradiated by this array antenna is the X direction.

The metallic case 41 has a rectangular parallelepiped box shape in which an opening part 42 is formed in one face in the thickness direction (X direction) and a cut-out opening 43 for drawing out the cable 21 connecting the sensor module main body 31 is formed in one side face in the short direction (−Z direction), and is made of aluminum material, for example.

The sensor module main body 31 is inserted through the opening part 42 with the front face Sa facing toward a bottom part 44 on the inner side (toward the −X direction), and the sensor module 30 is formed by closing of the opening part 42 with a rear face Sb (+X direction) of the sensor module main body 31. The sensor module main body 31 and the metallic case 41 are fixed with an adhesive. That is, a contact portion between the side faces of the sensor module main body 31 and the metallic case 41 is adhered. It is to be noted that a Y-Z cross-sectional shape of the outside of the sensor module main body 31 is the same as a Y-Z cross-sectional shape of the inside of the metallic case 41.

Here, a shape of the cut-out opening 43 is symmetrical with respect to a plane Sc that passes through the center C of the metallic case 41 and is perpendicular to the plane of the cut-out opening 43. The cut-out opening 43 is formed to be cut out from the opening part 42 side, not to include both end parts of the metallic case 41 in the long direction, and to include the plane Sc that is the center in the long direction. That is, in the cut-out opening 43, a distance from a center C1 on the plane Sc that is the center in the long direction to an end part Y2 in the +Y direction is equal to a distance from the center C1 to an end part Y1 in the −Y direction.

Thus, a shield for an antenna that is connected to the control chip 32 disposed in the center C and formed in the region E1 and an antenna that is connected to the control chip 32 disposed in the center C and formed in the region E2 becomes symmetrical in the Y direction with respect to the center C, and it is possible to equalize antenna characteristics of the antennas in the respective regions E1 and E2. As a result, synthetic control of the antenna directivity is facilitated and proximity detection accuracy can be improved.

In addition, since the metallic case 41 shields the −X direction opposite the irradiation direction (+X direction) of radio waves and four side faces in the Y-Z plane excluding the cut-out opening 43, it is possible to prevent radio waves from sneaking around and to perform highly accurate proximity detection.

It is to be noted that, as illustrated in FIG. 4, spacers 33 are provided on the front face Sa at both end parts in the long direction of the sensor module main body 31. The spacer 33 abuts against the bottom part 44 of the metallic case 41 and electrically conducts the long board of the sensor module main body 31 and the metallic case 41. The spacer 33 has a chamfered trapezoidal column shape, and a long side face of the trapezoidal column is connected to the front face Sa of the sensor module main body 31 and a short side face abuts against the bottom part 44 of the metallic case 41. When an external stress in the X direction is applied to the spacer 33, an amount of elastic deformation in the short direction (Z direction) is larger than an amount of elastic deformation in the long direction (Y direction) due to material and shape. It is to be noted that the spacer 33 is made of elastic material such as resin and its periphery is coated with conductive material.

Inside of this spacer 33 in the long direction, each resistor component 34 is disposed for adjusting the radio frequency of the antenna. This adjustment of the radio frequency is to set a transmission frequency to a common frequency band in which the use of a frequency in each country is not banned. Since the spacer 33 is easy to be elastically deformed and crushed in the short direction but difficult to be crushed in the long direction, as described above, the resistor component 34 is not crushed by the spacer 33 when an external stress is applied, and robustness can be enhanced. In addition, the resistor component 34 can be disposed on the long board in proximity to the spacer 33, and thus the sensor module main body 31 and the sensor module 30 can be made compact.

In addition, although various components are disposed on the front face Sa of the sensor module main body 31, the various components can be surely protected since the front face Sa is covered with the metallic case 41, and the sensor module 30 that is highly robust can be achieved since they are protected by the metallic case 41 even though an external stress is applied thereto.

It is to be noted that an insulation region E10 is formed over an entire circumference of a peripheral edge portion of the sensor module main body 31. This forms an insulation gap between a conductive pattern of the long board of the sensor module main body 31 and the metallic case 41, and measures against Electro-Static Discharge (ESD) are taken. In addition, it is possible to curb the influence of the metallic case 41 and maintain the impedance characteristics of only the antenna patterns by separating the patterns of the antennas in the regions E1 and E2 from the metallic case 41.

The bottom part 44 of the metallic case 41 of the above-described sensor module 30 is attached to the cover member 24 with a conductive adhesive etc. At that time, it is better to also apply sputtered metallic plating to the cover member 24 side. The sensor module 30 and the cover member 24 may be connected using a conductive double-sided tape. In addition, ribs for sandwiching the sensor module 30 may be formed on the cover member 24 side.

Since one or more embodiments do not need a connector such as a connection screw, compactification can be further improved.

It is to be noted that, although the above-described sensor module 30 is located on the top side of the display chassis 14, it may be located on the bottom side of the display chassis 14. Since the sensor module 30 is one for detecting proximity to the information processing apparatus 10, it may be disposed within a predetermined width in the right-and-left direction from the right-and-left center line of the display chassis 14 and main body chassis 16, for example, within 60 mm in the right or left direction.

In addition, the cut-out opening 43 may be the entire side face of the metallic case 41 in the −Z direction. This makes a shield of the metallic case 41 symmetrical in the Y direction with respect to the plane Sc, and it is possible to equalize antenna characteristics of the respective antennas in the regions E1 and E2.

It is to be noted that, when the sensor module 30 continues to detect proximity of a human, the information processing apparatus 10 does not shift to a sleep state even when there is no operation to the information processing apparatus 10, and when the sensor module 30 no longer detects the proximity of a human, it locks the display of the display surface 18a.

Modified Example 1

Figure 6:
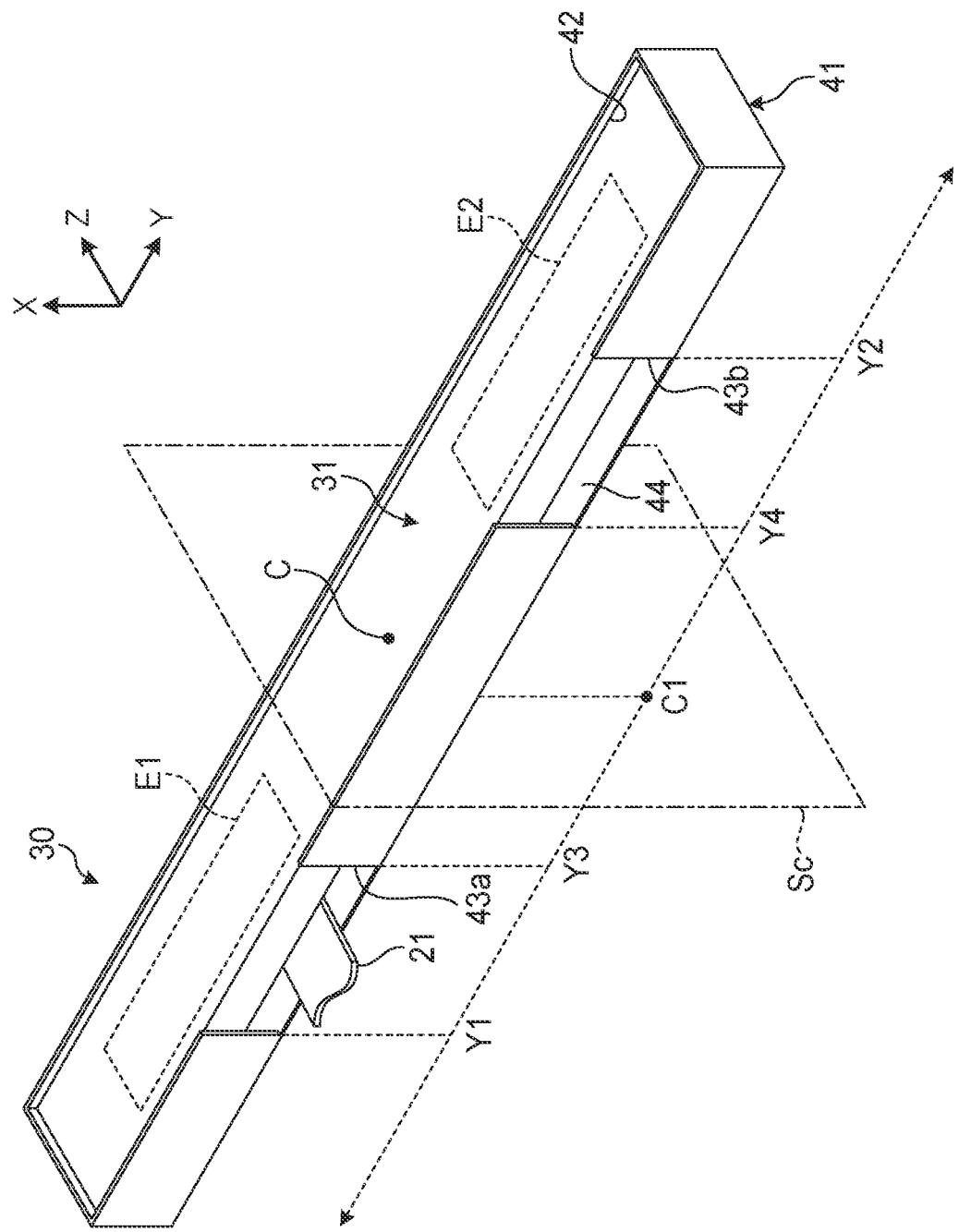
FIG. 6 is a view illustrating a configuration of a modified example 1 of the sensor module.

FIG. 6 is a view illustrating a configuration of a modified example 1 of the sensor module 30. As illustrated in FIG. 6, in the present modified example 1, two cut-out openings 43a and 43b are formed in place of the one cut-out opening 43. The cut-out opening 43a is a drawing-out opening for the cable 21 and the cut-out opening 43b is a dummy opening for equalizing antenna characteristics of the respective antennas in the regions E1 and E2. The length between end parts Y1 and Y3 of the cut-out opening 43a in the long direction is equal to that between end parts Y4 and Y2 of the cut-out opening 43b in the long direction. In addition, the shapes of the cut-out openings 43a and 43b are symmetrical in the long direction with respect to the plane Sc. Further, the cut-out openings 43a and 43b in the present modified example are plurally formed to be cut out from the opening part 42 side and not to include both end parts of the metallic case 41 in the long direction and the plane Sc that passes through the center C. Thus, it is also possible to equalize antenna characteristics of the antennas in the respective regions E1 and E2 in the present modified example 1.

It is to be noted that, although the cut-out opening 43 as illustrated in FIG. 3 is one cut-out opening that is aligned with a drawing-out position of the cable 21, the length of the cut-out opening 43 in the long direction becomes shorter when the drawing-out position of the cable 21 is, for example, at a side of the center C.

Modified Example 2

Figure 7:
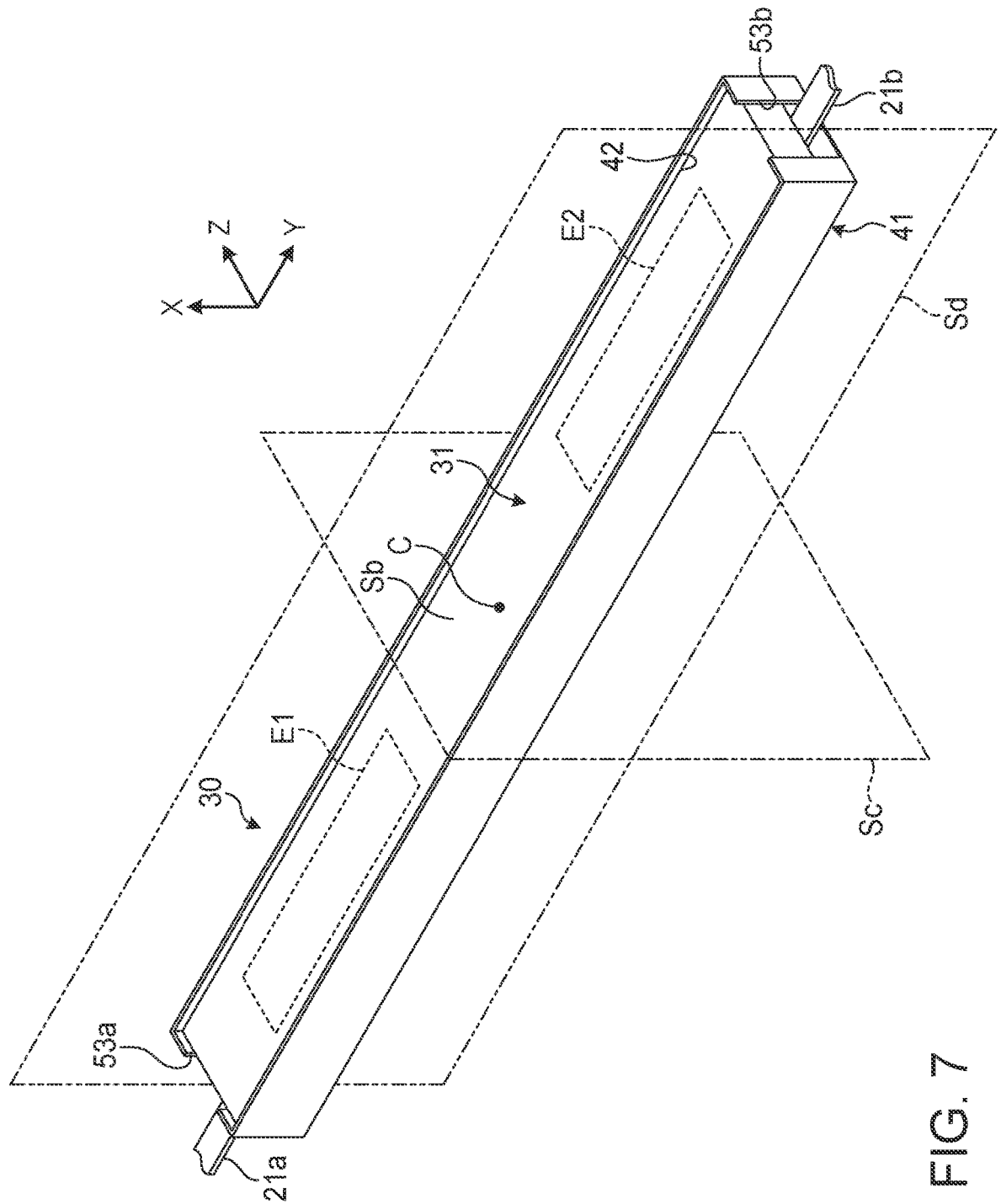
FIG. 7 is a view illustrating a configuration of a modified example 2 of the sensor module.

FIG. 7 is a view illustrating a configuration of a modified example 2 of the sensor module 30. As illustrated in FIG. 7, in the present modified example 2, cut-out openings 53a and 53b are formed at both end parts in the long direction. The respective cut-out openings 53a and 53b draw out two cables 21a and 21b corresponding to the cable 21, respectively. In addition, the cut-out openings 53a and 53b form shapes that are symmetrical with respect to the plane Sc. Thus, it is also possible to equalize antenna characteristics of the antennas in the respective regions E1 and E2 in the present modified example 2. It is to be noted that the present modified example 2 can be applied to an information processing apparatus in which the cables 21a and 21b can be drawn out in the long direction, for example, to a desktop PC.

It is to be noted that the cut-out openings 53a and 53b may be shaped to be symmetrical with respect to a plane Sd that passes through the center C of the metallic case 41 and is perpendicular to planes of the cut-out openings 53a and 53b. The cut-out openings 53a and 53b illustrated in FIG. 7 are shaped to be symmetrical with respect to both the plane Sc and the plane Sd. In addition, although in the modified example 2, the two cut-out openings 53a and 53b are formed, only either one of the cut-out openings 53a and 53b may be formed at either end part in the long direction.

In addition, the above-described cut-out openings 43, 43a, 43b, 53a and 53b are cut out from the opening part 42 side to the bottom part 44, not only this, however cutting depth may be to the drawing-out position of the cables 21, 21a, and 21b.

It is to be noted that each configuration illustrated in the above-described embodiments and modified examples is functionally schematic and needs not necessarily be physically configured as illustrated. That is, forms of distribution and integration of the respective devices and components are not limited to those illustrated in the drawings, and all or part thereof may be configured to be functionally or physically distributed or integrated in arbitrary units according to various usage conditions.

10 information processing apparatus
12 hinge device
14 display chassis
14a bottom end part
16 main body chassis
16a rear end part
18 display device
18a display surface
19 bezel member
20 module unit
21, 21a, 21b cable
24 cover member
26 keyboard device
27 touch-pad
30 sensor module
31 sensor module main body
32 control chip
33 spacer
34 resistor component
41 metallic case
42 opening part
43, 43a, 43b, 53a, 53b cut-out opening
44 bottom part
C, C1 center
E1, E2 region
E10 insulation region
Sa front face
Sb rear face
Sc, Sd plane Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A sensor module comprising:
   a sensor module main body that comprises a rectangular board having a radio radar sensor function; and
   a metallic case having a rectangular parallelepiped box shape, wherein the metallic case comprises:
      an opening part, formed at a first face of the metallic case, in a thickness direction and
      a cut-out opening, formed at a second face of the metallic case which is perpendicular to the first face, for drawing out a cable connecting the sensor module main body,
      wherein the opening part is closed by the rectangular board inserted through the opening part with a component disposed on a front face of the rectangular board facing toward a bottom part on an inner side,
      the cable is inserted into at least a part of the cut-out opening, and
      the cut-out opening is formed to be symmetrical with respect to a plane passing through a center of the metallic case and perpendicular to a plane of the cut-out opening.

2. The sensor module according to claim 1, wherein an insulation region is formed over an entire circumference of a peripheral edge portion of the rectangular board.

3. A sensor module comprising:
   a sensor module main body that comprises a rectangular board having a radio radar sensor function; and
   a metallic case having a rectangular parallelepiped box shape, wherein the metallic case comprises:
      an opening part, formed at a first face of the metallic case, in a thickness direction and
      a cut-out opening, formed at a second face of the metallic case which is perpendicular to the first face, for drawing out a cable connecting the sensor module main body,
      wherein the opening part is closed by the rectangular board inserted through the opening part with a component disposed on a front face of the rectangular board facing inward, an insulation region is formed over an entire circumference of a peripheral edge portion of the rectangular board.

4. The sensor module according to claim 1, wherein the cut-out opening is formed to be cut out at the second face in a short direction from the opening part side, not to include both end parts of the metallic case in a long direction, and to include the center in the long direction.

5. The sensor module according to claim 1, wherein a plurality of cut-out openings are formed to be cut out at the second face in a short direction from the opening part side and not to include both end parts and the center of the metallic case in a long direction.

6. The sensor module according to claim 1, wherein
the sensor module main body comprises spacers abutting against the bottom part of the metallic case and electrically conducting the rectangular board and the metallic case, on a front face at both end parts in a long direction of the sensor module main body,
an amount of elastic deformation of the spacer in a short direction is larger than an amount of elastic deformation in the long direction, and
the sensor module main body has a resistor component for adjusting a radio frequency disposed inside of the spacer in the long direction.

7. An information processing apparatus, comprising:
a display chassis; and
a sensor module disposed at a top end of the display chassis, wherein the sensor module comprises:
a sensor module main body that comprises a rectangular board having a radio radar sensor function, and
a metallic case having a rectangular parallelepiped box shape, wherein the metallic case comprises:
an opening part, formed at a first face of the metallic case, in a thickness direction and
a cut-out opening, formed at a second face of the metallic case which is perpendicular to the first face, for drawing out a cable connecting the sensor module main body,
wherein the opening part is closed by the rectangular board inserted through the opening part with a component disposed on a front face of the rectangular board facing toward a bottom part on an inner side,
the cable is inserted into at least a part of the cut-out opening, and
the cut-out opening is formed to be symmetrical with respect to a plane passing through a center of the metallic case and perpendicular to a plane of the cut-out opening.

* * * * *